US010091310B2

(12) United States Patent
Chan

(10) Patent No.: US 10,091,310 B2
(45) Date of Patent: Oct. 2, 2018

(54) METHOD AND SYSTEM FOR HIGH-LATENCY DATA COLLECTION FROM SENSORS

(71) Applicant: Verizon Patent and Licensing Inc., Arlington, VA (US)

(72) Inventor: Victor D. Chan, Newton, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 957 days.

(21) Appl. No.: 14/334,091

(22) Filed: Jul. 17, 2014

(65) Prior Publication Data
US 2016/0021169 A1 Jan. 21, 2016

(51) Int. Cl.
*H04L 1/00* (2006.01)
*H04L 29/08* (2006.01)

(52) U.S. Cl.
CPC .............. *H04L 67/18* (2013.01); *H04L 67/04* (2013.01); *H04L 67/12* (2013.01)

(58) Field of Classification Search
USPC ....................................................... 709/217
See application file for complete search history.

(56) References Cited

U.S. PATENT DOCUMENTS

| | | | | | |
|---|---|---|---|---|---|
| 6,630,883 | B1* | 10/2003 | Amin | ....................... | H04W 4/14 340/7.29 |
| 6,977,938 | B2* | 12/2005 | Alriksson | ............... | H04L 45/00 370/329 |
| 7,266,383 | B2* | 9/2007 | Anderson | ............... | H04L 67/04 370/338 |
| 7,450,517 | B2* | 11/2008 | Cho | ........................ | H04L 45/42 370/238 |
| 7,573,855 | B2* | 8/2009 | Hohl | ....................... | H04L 63/08 370/338 |
| 8,416,752 | B2* | 4/2013 | Watanabe | ............. | H04W 84/18 370/252 |
| 8,656,153 | B2* | 2/2014 | Xiao | ...................... | H04L 63/061 713/150 |
| 8,719,564 | B2* | 5/2014 | Hong | .................... | H04W 12/04 713/153 |
| 8,909,211 | B2* | 12/2014 | Huq | ....................... | H04L 67/125 455/419 |
| 2001/0024443 | A1* | 9/2001 | Alriksson | ............... | H04L 45/00 370/401 |
| 2004/0266347 | A1* | 12/2004 | Palin | ...................... | H04L 63/18 455/41.1 |
| 2005/0157661 | A1* | 7/2005 | Cho | ........................ | H04L 45/42 370/254 |
| 2006/0182045 | A1* | 8/2006 | Anderson | ............... | H04L 67/04 370/260 |

(Continued)

*Primary Examiner* — James R Hulka

(57) ABSTRACT

A method and system are disclosed that collect data from various devices, such as sensors, to a mobile device traveling in proximity to such devices. The mobile device may travel with a user who is traveling a regular-scheduled route. The devices may output a signal at a low frequency to preserve battery power. The mobile device may form an ad hoc connection with the devices using Bluetooth Low Energy, for example, and retrieve the data while the mobile device is in proximity to each of the devices. In this manner, the devices do not need to transmit data over long ranges or at a high speed, thereby preserving batter power for the devices.

20 Claims, 7 Drawing Sheets

(56) References Cited

U.S. PATENT DOCUMENTS

| | | | | |
|---|---|---|---|---|
| 2007/0184837 | A1* | 8/2007 | Hohl | H04L 63/08 455/435.1 |
| 2008/0248815 | A1* | 10/2008 | Busch | H04W 4/02 455/456.5 |
| 2009/0180425 | A1* | 7/2009 | Watanabe | H04W 84/18 370/328 |
| 2010/0099396 | A1* | 4/2010 | Huq | H04L 67/04 455/420 |
| 2010/0293370 | A1* | 11/2010 | Xiao | H04L 63/061 713/155 |
| 2011/0224935 | A1* | 9/2011 | Hampel | G01D 4/004 702/85 |
| 2012/0124511 | A1* | 5/2012 | Kawakami | G06F 1/1694 715/799 |
| 2013/0173910 | A1* | 7/2013 | Hong | H04W 12/04 713/153 |
| 2013/0212233 | A1* | 8/2013 | Landry | H04M 1/7253 709/220 |
| 2014/0035726 | A1* | 2/2014 | Schoner | G06K 7/10366 340/8.1 |
| 2014/0095577 | A1* | 4/2014 | Root | G06F 19/3412 709/202 |
| 2014/0096264 | A1* | 4/2014 | Root | G06F 19/3412 726/27 |

* cited by examiner

METHOD AND SYSTEM FOR HIGH-LATENCY DATA COLLECTION FROM SENSORS

FIELD OF THE INVENTION

The field of the present invention relates generally to a method and system for collecting data from sensors, such as machine-to-machine and internet-of-things sensors.

BACKGROUND

Telemetry involves machines and sensors collecting and sending data to a central point for storage or analysis. Wireless sensors, the Internet, and Internet-enabled devices have expanded telemetry use to numerous applications. Machine to Machine (M2M) refers to technologies that allow both wireless and wired systems to communicate with other devices of the same type. M2M is an integral part of the Internet of Things (IoT), which denotes advanced connectivity of devices. Wireless transfer of data from sensors or devices conventionally involves a sensor or device with wireless communication capabilities sending data to a wireless access point and/or or to a gateway data collector, for example. The wireless access point or gateway data collector may, in turn, transfer the data to a central repository or "the cloud," where the data may be held for future access or analysis. FIG. 1 shows a conventional data capture process where sensors/devices 110 broadcast data long-range to a wireless access point 111, which in turn sends the captured data to a gateway data collector 112, which may send the data to a central repository or cloud 102. Long-range broadcast of data from the sensors or devices affects battery life of the sensor/device, and often requires more expensive sensors or devices. Specifically, broadcasting data over long distances may drastically reduce service life of battery powered sensors or devices, thereby necessitating that more robust sensors/devices be used.

In wireless transmission of information, the amount of energy used is proportional to the distance that information is broadcast and the frequency of such broadcasts. Battery life of sensors may be optimized by increasing the number of wireless access points that retrieve information broadcast from the sensors because with an increased number of wireless access points the sensors would not have to transmit information as far. However, increasing the number of wireless access points requires a large upfront investment. An upfront investment in robust sensors, devices, and/or wireless access points, however, is often unjustified because not everything needs high speed wireless communication capabilities and many applications only require periodic (e.g., daily, weekly, monthly) data collection. Accordingly, the type of "real-time" messaging infrastructure that robust sensors, devices, wireless access points, and/or gateway data collectors enable is often unnecessary in a particular application. Several applications may only need periodic, batch collection of data from sensors or devices. The present invention addresses some of the problems inherent in conventional data collection from sensors or devices.

DETAILED DESCRIPTION OF THE INVENTION

Reference will be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

Exemplary embodiments of the present invention pertain to a "data burr" transport in which data is collected at various locations using a mobile device and then uploaded from the mobile device to a central repository. According to an embodiment of the present invention, a mobile device may act like a burr (in the general sense) and collect data within range of the mobile device. Also, a mobile device may travel with a person, thereby allowing for short-range data collection from various locations through which the person travels.

Figure 1:
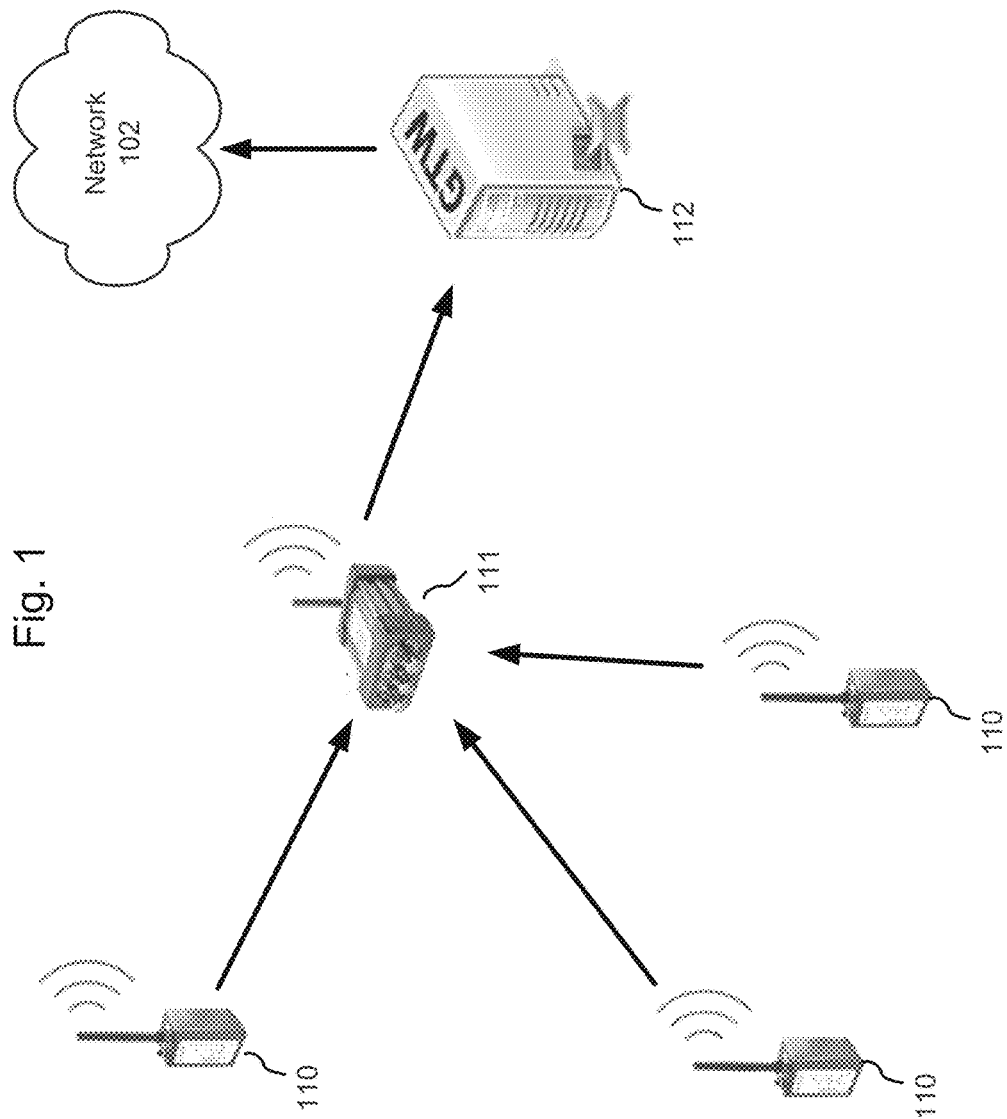
FIG. 1 depicts a conventional, long-range data collection process.
Figure 2:
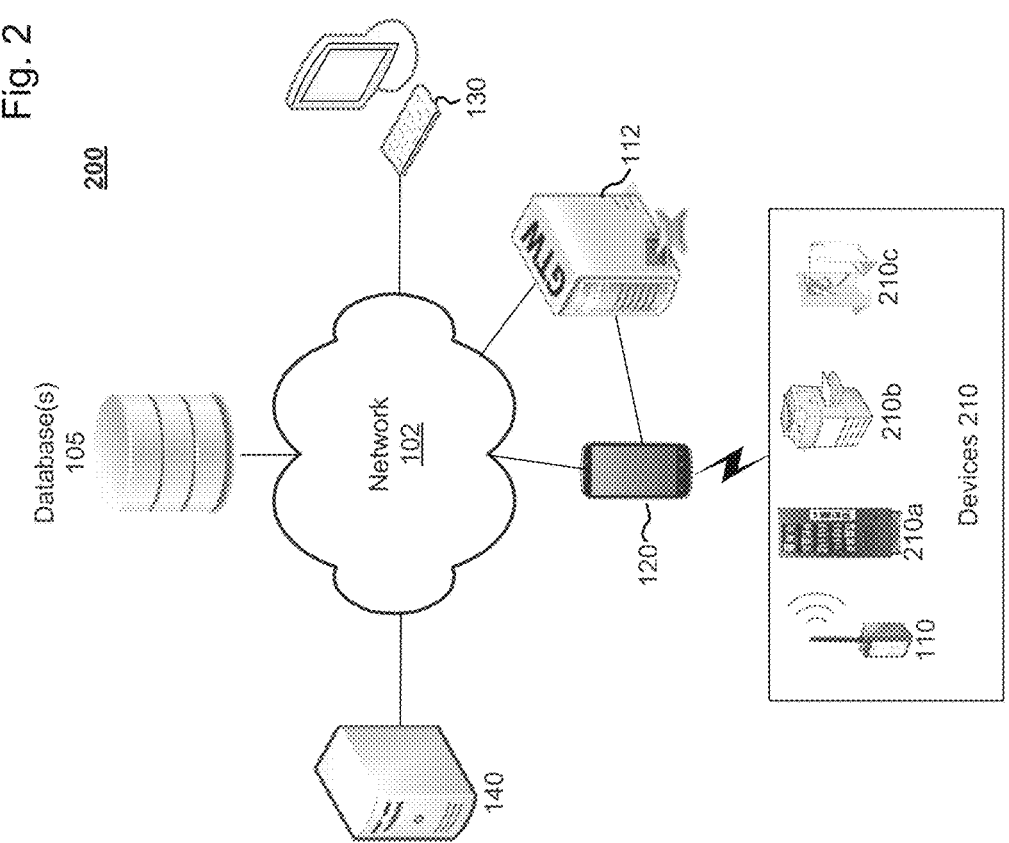
FIG. 2 depicts a schematic diagram of a system for enabling high latency data collection from devices or sensors, according to an exemplary embodiment.

Referring to FIG. 2, a schematic diagram of a system 200 for enabling high latency data collection from devices or sensors is shown, according to an exemplary embodiment. As illustrated, network 102 may be communicatively coupled with one or more data transmitting devices, data collectors, network elements, or computers, for example.

Devices 210 may represent any sensor or device that can be used in machine to machine communication. Exemplary devices 210 may include sensors 110, a vending machine 210a, a copy machine 210b, a turnstile 210c, a coffee machine, a soda machine, a kiosk, a camera, a digital billboard, a point-of-sale device, a printer, a projector, a scanner, a bridge for vehicle or pedestrian traffic, a mailbox, a shopping cart or basket, or any other device/sensor from which it may be desired to gather data, for example. The devices mentioned above are exemplary only, and it should be appreciated that other devices fall within the scope of the present invention. Other devices may include health care devices such as blood pressure monitors or heart rate monitors, for example. Hereafter, exemplary devices will be represented as "devices 210." Devices 210 may also include any object to which a device/sensor may be attached and from which it may be desirable to gather data. Many objects may be retrofitted with such a device. For example, a shopping cart may be considered an "object" that may be retro-fitted, and a device/sensor (or "device 210") may be attached to the shopping cart to enable data to be gathered with respect to the shopping cart (such as locations traveled by the shopping cart in a store and the amount of time spent in particular areas of the store, for example). In an exemplary embodiment, device 210 may comprise a sensor 110 that transmits data. Exemplary sensors may measure temperature, pressure, depth, conductivity, salinity, tilt, magnetic field strength, sound, acoustics, volume, acceleration, speed, drag, rotations, RPM, altitude, UV-rays, light, electrical current, electrical resistance, or other numerical measurements (such as number of copies made, number of coffees dispensed or vended, for example). Although the type of device 210 may be selected from a broad range of measurement devices, exemplary devices 210 will be suitable for high latency data situations. In other words, devices 210 may represent data transmitting devices that are used in situations where real-time data is unnecessary or not required. Device 210 may communicate with other devices 210, mobile device 120, wireless access point 111, or other network elements, using a wireless connection, and may utilize various machine-to-machine communication chipsets and low-power communication technologies, including, but not limited to, Bluetooth, Bluetooth Low Energy (BLE), ANT, ANT+, DASH7, iBeacon, ZigBee, Z-wave, or other protocols based on the IEEE 802.15 standard. Other short-range, but higher frequency, technologies may be used in some embodiments, such as Ultra-wideband, Wi-Fi (IEEE 802.11) WirelessHD, or WirelessUSB (WUSB).

Bluetooth Low Energy is a preferred communication technology for exemplary embodiments of the present invention. Connections via Bluetooth enable electronic devices to communicate wirelessly through short-range, ad hoc networks known as piconets. For example, one master device (e.g., a mobile device) may communicate with up to seven slave devices in a piconet (e.g., a network of up to eight devices). With Bluetooth enabled, piconets are established dynamically and automatically as Bluetooth-enabled devices enter and leave radio proximity. Bluetooth technology operates in the unlicensed industrial, scientific and medical (ISM) band at 2.4 to 2.485 GHz, using a spread spectrum, frequency hopping, full-duplex signal at a nominal rate of 1600 hops/sec. The core specification for Bluetooth typically mandates a minimum range of 30 feet, but there is no set limit and device range can be tuned to support particular use cases. Range may vary depending on class of radio used. Class 3 radios typically have a range of 3 feet. Class 2 radios typically have a range of approximately 33 feet. Class 1 radios typically have a range of approximately 300 feet. Exemplary devices 210 using Bluetooth technology may have a Class 2 radio. Moreover, devices 210 may take advantage of a feature in Bluetooth that allows radios to be powered down when inactive. Further, Bluetooth Low Energy is useful for devices requiring maximum battery life instead of a high data transfer rate, and effectively consumes ½ to ¹⁄₁₀₀ the power of classic Bluetooth technology. Accordingly, BLE is a preferred communication technology for implementing exemplary embodiments of the present invention. Devices 210 enabled to communicate via BLE can have significantly longer battery life. This battery life can be lengthened further by reducing transmission frequency from the devices 210.

Network client 130 may be a desktop computer, a laptop computer, a tablet computer, a personal digital assistant, or other digital computing device capable of sending or receiving network signals. Network client 130 may be operated by a person affiliated with a user of mobile device 120, such as a supervisor or information technology staff. Network client 130 may communicate with mobile device 120 by sending messages or prompts to mobile device 120. These messages or prompts may be based on data received or not received (but expected to be received) by mobile device 120 and/or network client 130, and such messages or prompts may be predetermined or custom messages/prompts based on the present circumstances.

Server 140 may be a database server, file server, mail server, print server, web server, gaming server, application server, or a peer-to-peer networking server, for example. In a particular embodiment, server 140 may be an application server that provides an application to, and/or runs an application on, mobile device 120. Such an application may enable registration between mobile device 120 and devices 210 from which the mobile device 120 is to gather data. Such an application may also enable mobile device 120 to timestamp and/or geostamp the received data, encrypt, process, analyze, and/or transmit the received data, and may also enable a user of mobile device 120 to communicate with other network devices, such as network client 130, gateway data collector 112, and/or database 105. For example, messages may be exchanged between a user of network client 130 and a user of mobile device 120 via an application installed on mobile device 120. The exemplary application may provide a graphical user interface (GUI) to a user of mobile device 120 to enable the user to provide inputs (e.g., observations and/or confirmations), Network 102 may be a wireless network, a wired network or any combination of wireless network and wired network. For example, network 102 may include one or more of a fiber optics network, a passive optical network, a cable network, an Internet network, an ad hoc network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support an Internet network, a wireless communication network, a cellular network, Bluetooth, Bluetooth Low Energy, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, the Internet or one or more of a service provider network, a government network, a cellular network, an enterprise network, corporate network, or home network.

Data may be transmitted and received via network 102 utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. Data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Mobile device 120 may be a mobile communications device, a smartphone, a tablet computer, a wearable computer such as in the form of a wristwatch, bracelet, or computerized glasses (including a head-up display), a cellular phone, a mobile phone, a personal digital assistant, a computer, a handheld multimedia device, a personal media player, a mobile television, or other computing devices capable of receiving data transmissions from devices 210. Mobile device 120 is preferably capable of receiving user input, such as in the form of a touch input, or input using a stylus, mouse, keypad, trackpad, keyboard, gesture input not using touch, motion input, voice input, or buttons, for example.

Mobile device 120 may communicate with network 102 either directly, or via a transceiver, or a computer such as the exemplary gateway data collector 112. The transceiver (not shown) may be a repeater, a microwave antenna, a cellular tower, or another network access device capable of providing connectivity between different network mediums. The transceiver may be capable of sending or receiving signals via a mobile network, a paging network, a cellular network, a satellite network or a radio network. The transceiver may provide connectivity to one or more wired networks and may be capable of receiving signals on one medium such as a wired network and transmitting the received signals on a second medium, such as a wireless network. Mobile device 120 may communicate with devices 210 via a short-range communication protocol including, but not limited to, using a radio sender/receiver, the IEEE 802.15 standard, Bluetooth, BLE, ZigBee, ANT, ANT+, DASH7, iBeacon, Z-Wave, Wi-Fi, wireless USB, Digital Enhanced Cordless Telecommunications (DECT), and so forth.

It should be appreciated that each of the communications devices, servers, modules, or network elements may include one or more processors. One or more data storage systems (e.g., database(s) 105) may also be coupled to network 102 or each of the devices or servers of the system. It should also be appreciated that software may be implemented in or executed by one or more computer processors, modules, network components, services, devices, or other similar systems.

System 200 of FIG. 2 may be implemented in a variety of ways. Architecture within system 200 may be implemented as a hardware component (e.g., as a module) within a network element. It should also be appreciated that architecture within system 200 may be implemented in computer executable software (e.g., on a tangible, non-transitory computer-readable medium) or may execute software communicatively-coupled thereto. Module functionality of architecture within system 200 may be located on a single device or distributed across a plurality of devices including one or more centralized servers and one or more mobile units or end-user devices, including mobile device 120.

Figure 3:
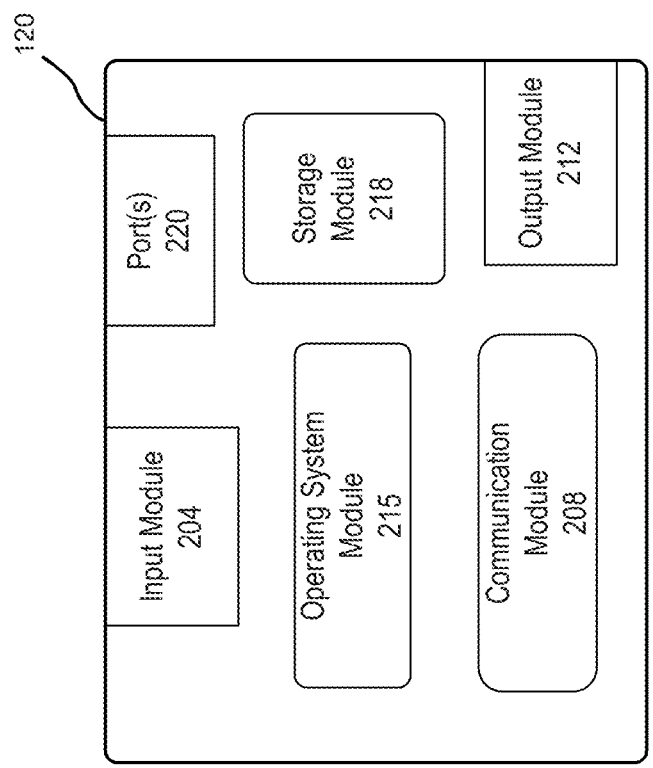
FIG. 3 depicts a block diagram of an exemplary mobile device, according to an exemplary embodiment of the invention.

Referring to FIG. 3, a block diagram of exemplary modules within mobile device 120 for receiving information from devices 210 and transmitting the information to another network element or directly to network 102, is shown, according to an exemplary embodiment. Storage module 218 may be a permanent data repository for storing information, such as information (e.g., sensor data) received from devices 210, or may be a buffer data repository for temporarily storing the information. Storage module 218 may also store other data relevant to applications, operating systems, or settings, used on mobile device 120.

Output module 212 may be configured to display or transmit information, such as messages. Information may be output within an application on a display screen of mobile device 120, or may be output audibly via speakers on mobile device 120, or via vibration patterns. Information may be output from mobile device 120 to another device (e.g., gateway data collector 112), computer (e.g., network client 130), or database (e.g., database 105) via network 102, for example. Output module 212 may communicate with other modules, such as operating system module 210, communication module 208, or storage module 218. For example, when communication module 208 receives a message from another network device (such as network client 130), that message may be output on the display screen of mobile device 120. Moreover, other messages may be output to a user of mobile device 120 via vibration patterns or sound, and such messages may relate to information received or not received (but expected to be received) from devices 210.

Communication module 208 may be configured to communicate with devices 210, network client 130, gateway data collector 112, database 105, and server 140. Such communication may be via a wireless or wired connection. Communication module 208 may comprise, or couple to, a radio, such as a BLE radio or iBeacon radio, a cellular chip (e.g., 3G, 4G, LTE), a WiFi chip, a Near Field Communication (NFC) sensor, a radio frequency identification (RFID) sensor, a location sensor (e.g., a GPS sensor), or other sensor/chip capable of communicating with devices 210, network 102, and other network elements, such as network client 130, gateway data collector 112, database 105, and server 140.

Communication module 208 may continually search for devices 210 to pair with for the purpose of receiving or exchanging data. For example, when mobile device 120 comes within range of one or more of devices 210, communication module 208 may "pair" with such devices 210 or begin to communicate with them via an ad hoc, short-range network connection. Devices 210 may transmit information and communication module 208 may receive such information when within range of such devices 210. Communication module 208 may timestamp and/or geostamp the information. More specifically, communication module may record the time at which the information is received from devices 210 and/or append such time directly to the received information in the form of metadata, for example. Communication module 208 may also record the location of mobile device 120 at which the information is received from devices 210, and/or append such location information directly to the received information in the form of metadata, for example. Location data for mobile device 120 may be retrieved from a location sensor (e.g., a GPS sensor) and/or calculated by triangulating WiFi or cellular signals, as understood by one of ordinary skill in the art. Accordingly, the information received from devices 210 need not have location data incorporated therein when broadcast from devices 210, and mobile device 120 may supply such location data upon receipt of information from devices 210.

Communication module 208 may also encrypt the information received from devices 210. Conventional devices 210 may not encrypt information that they gather. For example, conventional sensors are mass produced and are not designed to encrypt sensor data before transmission of such data. Communication module 208 may encrypt the received information before or after communication module 208 records or appends time and location data to the received information. Communication module 208 may store the received information and the time and location data (encrypted or unencrypted) in storage module 218, or may transmit such data (encrypted or unencrypted) to another network device, such as gateway data collector 112, network client 130, or database 105, for example.

Input module 204 may be configured to detect user inputs, such as touch, audible, keys, soft keys, or button inputs, for example. Input module 204 may also be configured to receive comments or confirmations from a user of mobile device 120. For example, a user of mobile device 120 may observe a situation that may be relevant to devices 210 and may record comments (via keyboard input or audibly, for example) into mobile device 120. Exemplary situations may include the user noticing moisture in an area (e.g., abnormal water in a room); an excessive temperature in an area; an item running low or out of stock (e.g., drinks, snacks, paper, or other products); something broken, malfunctioning, or out of order; something out of place; or an atypical setting on a device (such as a thermostat setting), for example. Other exemplary situations about which a user of mobile device 120 may comment may include the opposite of the exemplary situations listed above, such as an indication that everything appears to be in order or normal. Input module 204 may be configured to receive confirmations from a user of mobile device 120. A user may receive various messages on mobile device 120, and these messages may be based on information received from devices 210 or from another user/network client via network 102. For example, data received from a device 210 may exceed a predetermined threshold established for the particular device 210. By way of example, thresholds may be established for a temperature sensor, which thresholds may be stored on mobile device 120 or stored remotely from mobile device 120. Data received from the temperature sensor may exceed the threshold(s), which may prompt a message to be displayed to a user of mobile device 120, such as, "Please confirm thermostat setting in current room." Thereupon, the user may check the thermostat in the particular room and either enter the thermostat setting, confirm that the thermostat is set to a particular temperature, such as 74 degrees, or otherwise confirm that everything appears to be in order. By way of another example, data received from a humidity sensor may exceed a threshold for the humidity sensor, and the user may be prompted to confirm the absence of water on the floor or running water in the room (e.g., a bathroom). The user may respond appropriately after confirming a status, and input module 204 may receive and record such user input, and close the message prompt. This and other types of user inputs may be stored in storage module 218 and/or transmitted to other network devices, such as gateway data collector 112, network client 130, server 140, and database 105, for example.

Port(s) 220 and operating system module 210 may be configured to operate as on a conventional mobile devices 120, such as a smartphone. For example, operating system 210 may be configured to run an operating system on mobile device 120 and port(s) 220 may allow a user to charge mobile device 120 and/or transmit data to/from mobile device 120.

Figure 4:
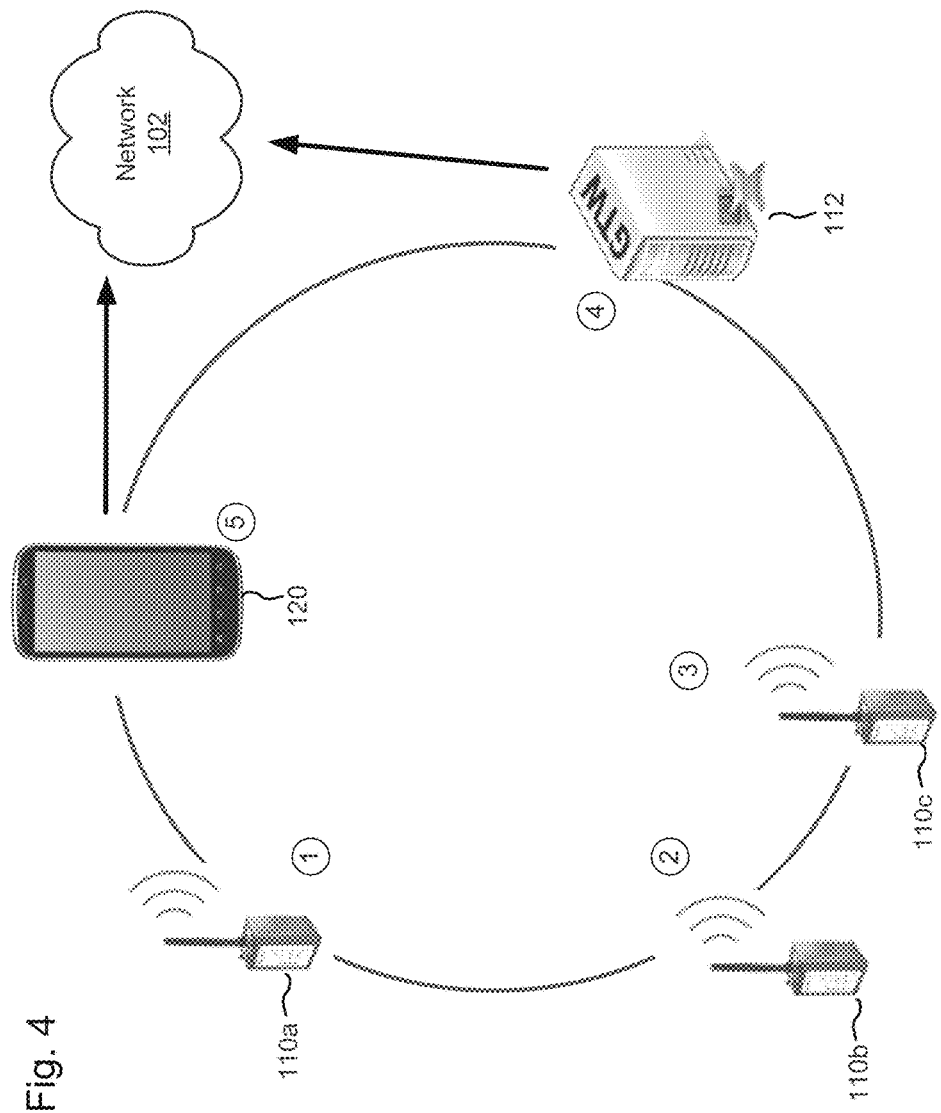
FIG. 4 depicts a data collection process using a mobile device traveling in proximity to various sensors, according to an exemplary embodiment of the invention.

Referring to FIG. 4, a user may travel with mobile device 120 in a planned or unplanned route, and throughout such route, information may be received at mobile device 120 from various devices 210, shown as exemplary sensors 110 in FIG. 4. In a preferred embodiment, mobile device 120 traverses a planned, regularly-scheduled route. In many settings, a person may travel a regularly-scheduled route. Examples may include janitorial staff, cleaning staff, security staff, mail staff, delivery staff, medical staff, or other persons. "Staff" may simply refer to a person, including a person that takes a regularly-scheduled route. In other embodiments, "user" or "staff" may refer to a robotic device, such as a robotic vacuum, an autonomous vehicle, or a self-guided vehicle, for example. Staff members may act as data transfer agents for a low cost, short-range, low frequency, mobile data collection mechanism. Staff members may carry mobile device 120 and as the staff members travel their regularly-scheduled route, mobile device 120 can collect data from devices 210 (e.g., sensors 110) at various locations along the route as mobile device 120 comes within proximity of the devices 210. Mobile device 120 may also timestamp and/or geostamp the data, and then ultimately upload the data to a central repository (e.g., immediately or at the end of the route). The devices 210 from which mobile device 120 collects data need not have a long-range communication capability, and need not expend battery power to transmit data long distances. Rather, short-range communication technologies may be used, thereby enhancing battery life in the devices 210 and avoiding the need for robust equipment. Moreover, devices 210 may be configured to only transmit data every 10 seconds to 1 minute, or more preferably, every 30 seconds to 1 minute. Conventional sensors, for example, are configured to transmit data in "real-time," such as twice per second. By reducing data transmissions to once every thirty seconds, for example, $\frac{1}{60}^{th}$ amount of energy may be used by the device 210 as compared with conventional data transmission rates, thereby substantially prolonging battery life of the device 210.

Mobile device 120 may be located on equipment (e.g., a cart) used by the user traveling the regularly-scheduled route. Mobile device 120 may be hidden on such equipment. The user may or may not know that he/she is hauling mobile device 120 around and/or the user may or may not know that mobile device 120 is collecting data from devices 210 as the user travels around (e.g., on the regularly-scheduled route). In this manner, data collection may be passive or transparent to the user travelling the regularly-scheduled route(s). Moreover, the regularly-scheduled routes can either augment or be the core data collection activity from the devices 210. In other words, users travelling the regularly-scheduled routes and collecting data from devices 210 may satisfy the data collecting needs with respect to devices 210. Thus, the presently disclosed system of data collection may be easily added to currently running business operations with little or no impact to those operations and with little up-front cost.

Referring again to FIG. 4, a user may carry mobile device 120 on equipment (e.g., a cart) or on his/her person. By way of example, the user may be a janitor traveling around with a vacuum or a garbage can. The user may have a predetermined or regularly-scheduled route, such as vacuuming or emptying garbage cans in several offices and rooms on one or more floors of an office building. The user may travel to a first location (labeled "1") near which is a first sensor 110a. The first location may be a room housing computers or servers and the first sensor may be a temperature sensor. While the user is vacuuming or collecting garbage at the first location, mobile device 120 may pair with sensor 110a at location 1 and/or sensor 110a may transmit data to mobile device 120. Such pairing and/or data collection may be passive to the user. The user may finish his/her task at location 1 and travel to a second location (labeled "2") near which is a second sensor 110b. The second location may be a copy room housing copiers, fax machines, printers, or other office equipment, and the second sensor 110b may be configured to detect how many copies/faxes/prints were made (such as in a day, a week, or a month, for example). While the user is performing his/her routine task at location 2, mobile device 120 may pair with sensor 110b at location 2 and/or sensor 110b may transmit data to mobile device 120. The user may finish his/her task at location 2 and travel to a third location (labeled "3") near which is a third sensor 110c. The third location may be a kitchen housing various appliances, such as a coffee machine, vending machine, sink, refrigerator, freezer, ice maker, or microwave, for example. Sensor 110c may be configured to detect how many coffees were dispensed or how many snacks were dispensed and which kinds. Alternatively or additionally, sensor 110c may be configured to detect a temperature, moisture, water, or humidity, for example. While the user is performing his/her routine task at location 3, mobile device 120 may pair with sensor 110c at location 2 and/or sensor 110c may transmit data to mobile device 120.

Upon receiving data from sensors 110a, 110b, and/or 110c, mobile device 120 may timestamp and/or geostamp such data to record a time and/or location at which the data was received. Mobile device 120 may transmit the data upon receipt of such data or may transmit at a future time, such as upon returning to an original location or upon charging mobile device 120. The data may be transmitted by mobile device 120 to a gateway data collector 112 at a location labeled "4" in FIG. 4, and the gateway data collector 112 may transmit the data to network 102. Alternatively, mobile device 120 may transmit the data directly to network 102 at a location labeled "5" in FIG. 4. Locations "4" and "5" may be one or more locations, and each of locations 1-5 in FIG. 4 are not meant to be in sequential order or chronological. For example, mobile device 120 may transmit data to network 102 immediately upon receipt of such data from sensor 110a, and repeat the process upon receipt of other data from other sensors (e.g., 110b, 110c) or devices 210. Sensors 110a, 110b, 110c, are exemplary only, and each may represent one or more sensors or devices 210. Additionally, as mentioned above, data received from sensors (e.g., 110a, 110b, 110c) or devices 210 may be encrypted upon receipt and before transmission to gateway data collector 112 or network 102. Network 102 may represent the "cloud" and may comprise a database (e.g., database 105) to which the data is transmitted, stored, and made available for processing or analysis, and/or accessible by other network devices. Alternatively, the data may be transmitted to other network devices (e.g., network client 130 or server 140) via network 102, as shown, for example, in FIG. 2.

Figure 5:
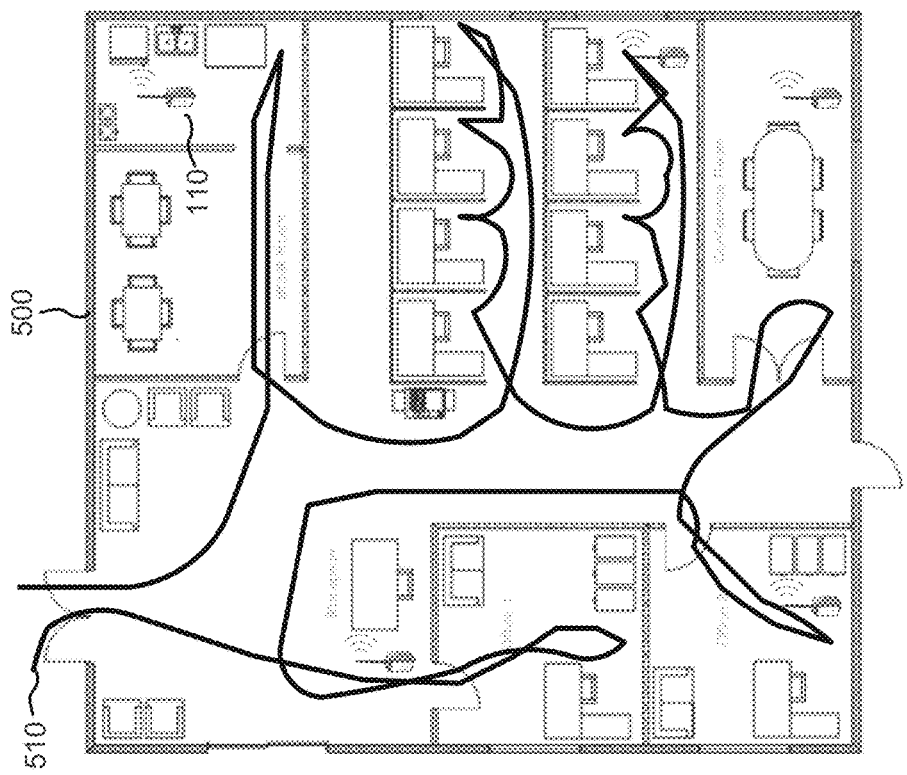
FIG. 5 is an illustrative diagram depicting a user traveling a regular-scheduled route near sensors, according to an exemplary embodiment of the invention.

Referring to FIG. 5, an exemplary floor plan 500 is shown with an exemplary route 510 traveled by a staff member. Floor plan 500 may represent a portion of a building and may represent part of a staff member's route or responsibility. Various sensors 110 (or devices 210) may be located at various points in the area represented by floor plan 500. As the staff member performs his/her regular routine (e.g., nightly cleaning or security checks), information gathered by sensors 110 may be transmitted from sensors 110 to a mobile device 120 carried around by the staff member. The information may represent temperatures, an average temperature (e.g., for the day or week), presence of water, presence of people, number of items, etc., depending on the type of sensor. Such information may be useful in determining whether particular systems are operating properly (e.g., HVAC, plumbing, vending, electrical, network, security, microphones, lighting, shades, or other automated systems). As the information is gathered, or when the staff member is in the vicinity of a data upload point, the information may be transferred from the mobile device 120 to database 105, network client 130, gateway data collector 112, or server 140, for example. Alternatively, the information may be manually uploaded by a staff member interacting with an application on mobile device 120 (e.g., by providing instructions to upload the information by touch input), by a wired connection, or a combination thereof. After the information is uploaded to database 105, network client 130, gateway data collector 112, or server 140, for example, the information may be erased from mobile device 120 and/or archived locally or remotely to mobile device 120.

Data collection from devices 210 using mobile device 120 may be entirely passive/transparent, or on a "best effort collection" or "guaranteed collection" basis, for example. In an entirely passive/transparent collection system, the user of mobile device 120 is unaware of the data collection, and therefore may not be rewarded or penalized for the accuracy or extent of data collection. In a best effort collection, if data is not collected from a device 210 (e.g., sensor 110), then a warning or a prompt may be generated and sent (e.g., by server 140 or network client 130) either to network client 130 or directly to mobile device 120. Periodic summary reports may be generated by server 140 or network client 130 to highlight missing sensor data uploads. In a guaranteed collection system, a user of mobile device 120 or network client 130, for example, may confirm that data collection has occurred as each device 210 is traversed (e.g., as a user of mobile device 120 travels the regular route). If data is not collected from a particular device 210, a user of mobile device 120 may be re-dispatched or prompted to go gather such data (by coming within range of the particular device 210).

Data from sensors may be relatively small and may simply be a few bytes or a few kilobytes of data. Accordingly, data transfer speeds should be relatively fast, thereby minimizing the risk of incomplete data transfer from a particular device 210 while mobile device 120 is in the vicinity of the device 210. After data transfer from the devices 210 to mobile device 120, mobile device 120 may perform some processing on the data using, for example, operating system module 210. For example, mobile device 120 may calculate average values for the data from a particular device 210 or multiple devices 210, identify outliers in the data, compare the data to previously collected data or to a threshold, for example. Alternatively, minor processing may occur at the devices 210 prior to transmitting to a mobile device 120, such as calculation of average values, etc.

In one embodiment, mobile device 120 may receive data from only registered devices 210. In other words, particular devices 210 may be registered with mobile device 120 such that mobile device 120 knows which devices 210 to pair with and receive data from. Thus, a list of devices 210 may be stored in storage module 218 of mobile device 120, which list may represent the devices 210 registered with mobile device 120. If mobile device 120 does not receive data, or receives incomplete data, from one of the particular devices 210 in the registration list over a particular period of time (e.g., 1 day, 1 week, 1 month), then a message or prompt may be displayed on mobile device 120 to prompt the user to go to a particular location to retrieve the missed data. Further, IDs, locations, and device type of each device 210 may be listed in the registration list stored on mobile device 120. Such a registration list may be accessible and updatable by a user of mobile device 120 or network client 130 using an application on mobile device 120 or network client 130.

Data from devices 210 may also be encrypted at mobile device 120. Devices 210 may not encrypt the sensed/measured data before transmission. However, operating system module 215, for example, on mobile device 120 may encrypt data received from devices 210 to ensure that such data is protected and/or remains private.

Figure 6:
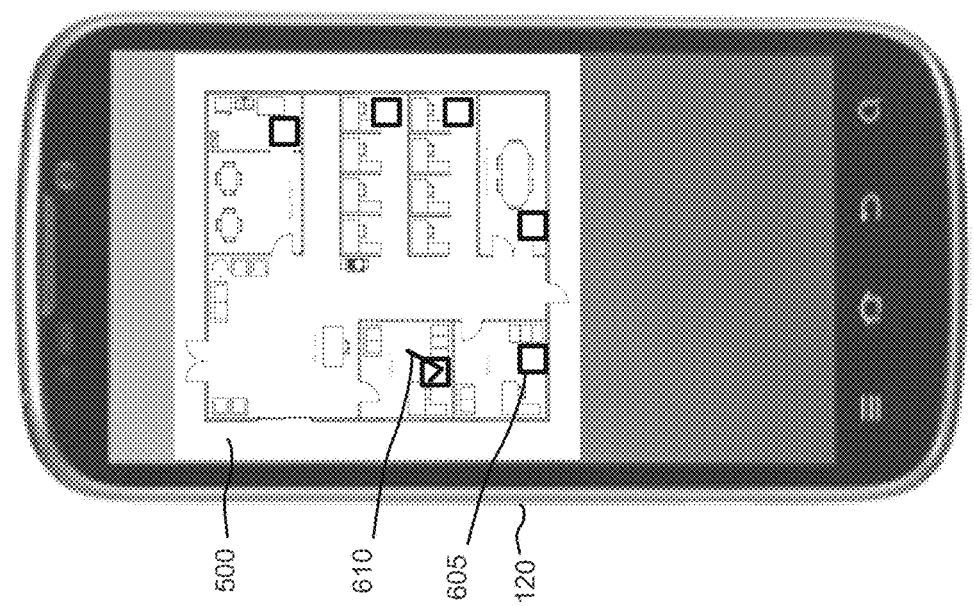
FIG. 6 depicts a navigational guide that is output on a mobile device to aid a user in traveling a route near sensors, according to an exemplary embodiment of the invention.

Referring to FIG. 6, the exemplary floor plan 500 from FIG. 5 is shown on mobile device 120. Again, floor plan 500 may represent a portion of a building and may represent part of a staff member's route or responsibility. Various graphics, such as boxes 605, may represent locations to which the staff member should travel to complete the staff member's route or responsibility. As the staff member completes or travels to the various locations represented with graphical objects 605, the graphical objects 605 may change (such as by inclusion of a checkmark 610, for example) automatically or upon user input so as to indicate that the staff member has traveled to that location. Mobile device 120 may know whether the staff member traveled to that particular location by receiving location data from the location sensor (e.g., a GPS sensor) in communication module 208 and/or by triangulating WiFi or cellular signals sensed by communication module 208 of mobile device 120. Additionally or alternatively, the graphical objects 605 may change (such as inclusion of a checkmark 610, for example) when mobile device 120 receives sensor data from relevant devices 210. As explained above with reference to FIG. 5, various sensors 110 (or devices 210) may be located at various points in the area represented by floor plan 500. As the staff member performs his/her regular routine (e.g., nightly cleaning or security checks), information gathered by sensors 110 may be transmitted from sensors 110 to a mobile device 120 carried around by the staff member. As data is gathered from particular sensors that may or may not be proximate to the graphical objects 605 on floor plan 500, the graphical objects may change (e.g., by inclusion of a checkmark 610) to indicate that the relevant data has been retrieved and/or to indicate that the staff member may proceed to another location represented by another graphical object 605. In this manner, assurance may be provided that the staff member has traversed particular locations in a given area. Mobile device 120 may also indicate the staff member's current location (with another graphical object on floor plan 500, for example) so as to aid the staff member in determining where to go next.

After the data from devices 210 is uploaded by mobile device 120 to database 105, network client 130, gateway data collector 112, or server 140, for example, data analysis may be performed on the data. The data analysis may include data trending analysis, graphical representation of the data (e.g., scatter plots), bivariate associations (e.g., correlations of data variables between two or more devices 210), univariate statistics (e.g., analysis of a single variable from a single device 210), identification of missing data or outliers, calculations of average values, mode, minimums, maximums, or frequency counts (identifying frequency of data collection and/or number of data points collected over a period of time). The device to which the data was uploaded may perform the data analysis (e.g., server 140). Data analysis may also be said to comprise data monitoring. Data monitoring may identify a problem or an event that may require action by a user or that may prompt a message to a user. The types of problems or events that may prompt action or a message may include detecting that a device 210 has malfunctioned, a device 210 has recorded a measurement that surpasses a threshold, two or more instances of raw data for the same device 210 differ widely, location data (e.g., a geostamp as applied by mobile device 120) for a device 210 indicates that device 210 is in an unexpected location, a network device is in a down state, communication services have halted, receipt/transmission of data has halted, or a data breach has occurred, for example. Thresholds may be set by a user of one of the mobile device 120, network client 130, gateway data collector 112, server 140, for example.

Data analysis may indicate a need for further sensor management. Sensor management may include registration or deregistration of one or more (new/old) devices 210, or battery replacement of devices 210, for example. If data has not been retrieved from a particular device 210 for some period of time, despite efforts to collect such data, a battery on such device 210 may need to be replaced.

Data analysis may also aid in route planning for data collection. Using the above example, if data has not been retrieved from a particular device 210 for some period of time, a route may need to be modified in order to collect such data.

Figure 7:
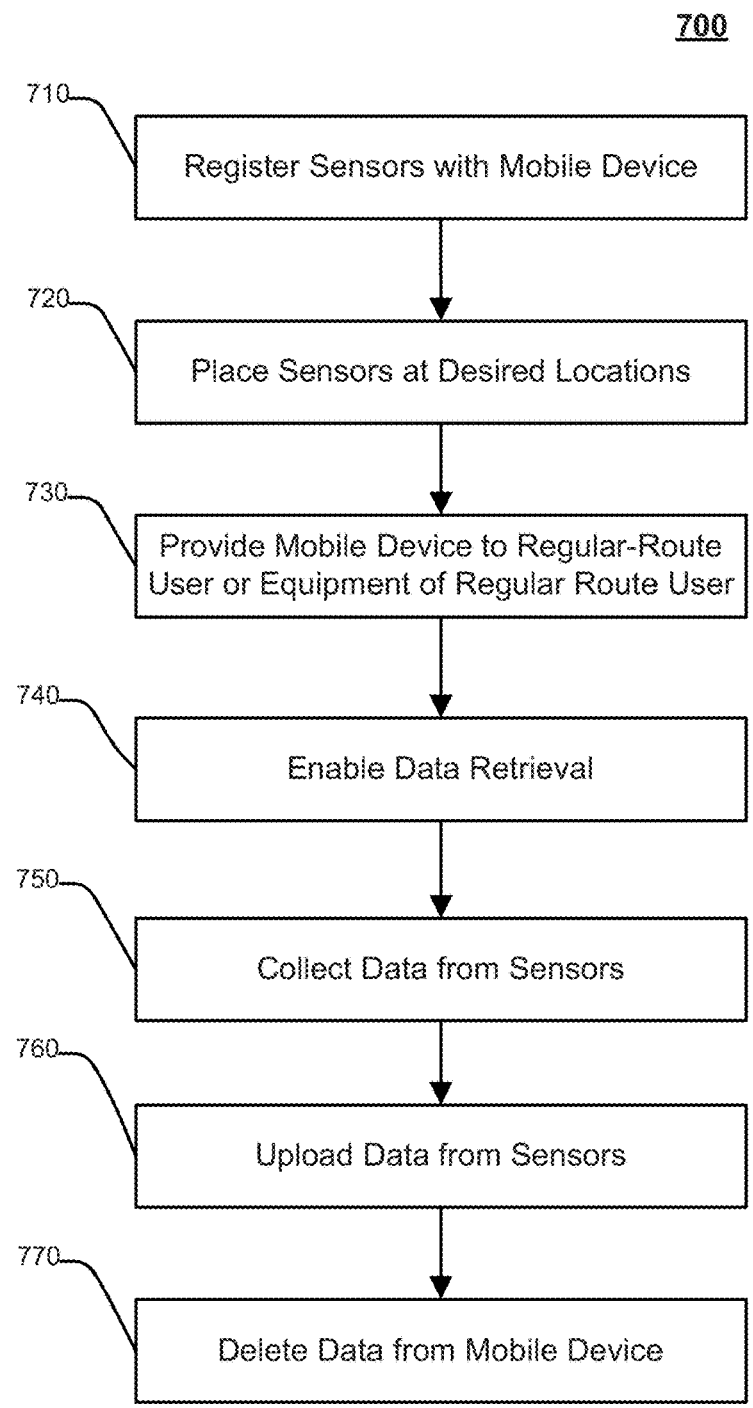
FIG. 7 is an illustrative flowchart of data collection to a mobile device from sensors, according to an exemplary embodiment of the invention.

Referring to FIG. 7, an illustrative flowchart of a method for data collection from sensors is shown. Again, sensors may refer to devices 210. This exemplary method 700 is provided by way of example, as there are a variety of ways to carry out methods according to the present disclosure. Method 700 shown in FIG. 7 can be executed or otherwise performed by one or a combination of various systems and modules. Method 700 described below may be carried out by system 200 shown in FIG. 2 and the modules shown in FIG. 3, by way of example, and various elements of system 200 and the modules of FIG. 3 are referenced in explaining the exemplary method of FIG. 7. Each block shown in FIG. 7 represents one or more processes, decisions, methods or subroutines carried out in exemplary method 700, and these processes, decisions, methods or subroutines are not necessarily carried out in the specific order outlined in FIG. 7, nor is each of them required. Referring to FIG. 7, exemplary method 700 may begin at 710.

At 710, devices 210 may be registered with a mobile device 120. Registration may entail entering identification data and communication data for devices 210 into mobile device 120. Identification data for devices 210 may comprise a device ID, a device type, and a device location, for example. Communication data for devices 210 may comprise a data transmission frequency (e.g., 2.4 GHz), a data type (e.g., text), a data transmission radius or range (e.g., 30 m), or a frequency of data transmission (e.g., every 10 seconds to 1 minute, or every 30 seconds to 1 minute), for example. After registration, mobile device 120 may be enabled to retrieve data from devices 210.

At 720, devices 210 may be placed at desired locations. Exemplary locations at which devices 210 may be placed may include apartments, kitchens, pantries, server rooms, offices, self-storage lockers, vehicles, mailboxes, cargo bays, near appliances, laboratories, pools, wells, roofs, etc.

At 730, mobile device 120 may be provided to a user having a regular-route, or may be placed on equipment that will be used by a regular-route user. The user of mobile device 120 may or may not know that mobile device 120 will gather data from devices 210 and may or may not know that he/she is transporting mobile device 120.

At 740, data retrieval may be enabled on mobile device 120. Enabling data retrieval may comprise installing an application on mobile device 120, starting an application on mobile device 120, powering on mobile device 120, enabling the a radio (such as a Bluetooth radio) on mobile device 120, or any combination of these. An application installed on mobile device 120 may be configured to cause mobile device 120 to scan for nearby fixed transmitters or signal sources (e.g., devices 210), form an ad hoc network connection by pairing with the device(s) 210, receive signals therefrom, and record on the mobile device 120 data transmitted with the signals and/or transmit the received data to another network device or a database, such as a gateway data collector or the cloud.

At 750, after mobile device 120 has been enabled to receive data, mobile device 120 may wirelessly query, or poll, devices 210, and receive data from them while the regular-route user performs his/her regular route. As mobile device 120 comes in proximity with devices 210 (e.g., as the regular-route user travels the route and causes mobile device 120 to come into physical proximity with devices 210), devices 210 may transmit a signal according to a predetermined period (such as every 30 seconds to 1 minute, for example). The regular-route user traveling on his/her regular route may cause mobile device 120 to be within range of devices 210 for a sufficient time such that the signal is received from devices 210. As the data from devices 210 is wirelessly received, such data may be stored locally on mobile device 120 (such as in storage module 218), and/or may be transmitted (typically wirelessly, but could be transmitted via a wired connection) to another network device or to a database for storage remote from mobile device 120. Such receipt and transmission of data from devices 210 may be transparent to a user (or carrier) of mobile device 120. This process may continue as the regular-route user continues to travel along his/her regular route, such that data from other devices 210 may be gathered by mobile device 120.

If data was not gathered from a particular device 210, a message may be sent to mobile device 120 alerting the regular-route user to return to (or travel to) a particular location that is in proximity to the particular device 210. Such may occur if the regular-route user was not in proximity to the particular device 210 for a sufficient period of time (e.g., for a period greater than the transmission frequency established for the particular device 210). Alternatively, a notification may be sent to another user (such as a supervisor of the regular-route user), such that the other user may know whether to instruct the regular-route user to return to a particular location in proximity to the particular device 210.

At 760, the data gathered from devices 210 may be uploaded (either wirelessly, or via a wired connection) to another network device or a database, such as a gateway data collector 112 or the cloud, via network 102, for example. Mobile device 120 may form another ad hoc network connection with the network device or database to which the data is uploaded. Such a network connection may be established via Wi-Fi, Bluetooth, or other short-range communication wireless means, and mobile device 120, and module 208, may perform and/or initiate the upload when coming into, or when already within, the proximity of the short range wireless communication means, which may be generated by a device referred to as a data upload point. In addition, the short-range communication network may initiate uploading of sensor data that mobile device 120 has stored thereon upon mobile device 120 coming within proximity of its wireless signal, or within its wireless signal range. Alternatively, a cellular connection may connect mobile device 120 with the network device or database to which the data is uploaded, for example. The data may be uploaded in a batch mode or may be uploaded in real-time from mobile device 120. The data may be uploaded after each time it is collected from devices 210, and/or may be uploaded on a weekly, monthly, or quarterly basis, for example. Before uploading, the data may be encrypted on mobile device 120 to increase security of the data, as explained above.

At 770, once the data is uploaded from mobile device 120, such data may be deleted from mobile device 120.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method, comprising:
    registering, by a mobile device, a plurality of sensors,
        the plurality of sensors including at least one of:
            a temperature sensor,
            a pressure sensor,
            a humidity sensor,
            a depth sensor,
            a conductivity sensor,
            a salinity sensor,
            a tilt sensor,
            a sound sensor,
            a volume sensor,
            a rotation sensor,
            a light sensor, or
            an electrical current sensor, and
        the plurality of sensors being disposed along a route to be traveled by a user of the mobile device,
            each of the plurality of sensors being positioned at a particular location along the route, and
            the route being in proximity to each of the plurality of sensors;
    storing, by the mobile device, a list of identifiers for the plurality of sensors on the mobile device;
    outputting, by the mobile device, information identifying the route on the mobile device to inform the user where to travel so as to be in proximity to at least one of the plurality of sensors;
    forming, by the mobile device, an ad hoc connection through a pairing mechanism between the mobile device and each of the plurality of sensors as the user travels the route,
        an identifier for each of the plurality of sensors being compared to the list of identifiers stored on the mobile device;
    collecting, by the mobile device, data from the plurality of sensors via the ad hoc connection,
        each of the plurality of sensors to send the data to the mobile device;

transmitting, by the mobile device, the collected data to a central repository;
receiving, by the mobile device and from the central repository, information related to a problem or event associated with the collected data,
the information being related to the at least one of the plurality of sensors not sending the data or sending incomplete data to the mobile device; and
receiving, by the mobile device and from the central repository, a message indicating that the user is to travel to a particular location associated with the problem or event.

2. Method of claim 1, wherein the pairing mechanism is at least one of:
a Bluetooth Low Energy (BLE) pairing, or
a Wi-Fi connection.

3. The method of claim 1, wherein the user is a member of a cleaning staff, a security staff, or a delivery staff, and
the route is associated with a regularly-scheduled route for the cleaning staff, the security staff, or the delivery staff, respectively.

4. The method of claim 1, wherein the data is encrypted on the mobile device after collection from the plurality of sensors and before being uploaded to the central repository.

5. The method of claim 1, wherein the mobile device timestamps and location-stamps the collected data upon collection from the plurality of sensors.

6. The method of claim 1, wherein forming the ad hoc connection through the pairing mechanism between the mobile device and each of the plurality of sensors comprises:
scanning the route for nearby sensors.

7. A system comprising:
one or more memories to store instructions; and
one or more processors to execute the instructions to;
register a plurality of sensors with a mobile device,
the plurality of sensors including at least one of:
a temperature sensor,
a pressure sensor,
a humidity sensor,
a depth sensor,
a conductivity sensor,
a salinity sensor,
a tilt sensor,
a sound sensor,
a volume sensor,
a rotation sensor,
a light sensor, or
an electrical current sensor,
each of the plurality of sensors being positioned at a particular location along a route,
the route being in proximity to each of the plurality of sensors;
store a list of identifiers for the plurality of sensors on the mobile device;
output information identifying the route on the mobile device to inform a user of the mobile device where to travel so as to be in proximity to at least one of the plurality of sensors;
form an ad hoc connection through a pairing mechanism between the mobile device and each of the plurality of sensors as the user travels the route,
an identifier for each of the plurality of sensors being compared to the list of identifiers stored on the mobile device;
collect data from the plurality of sensors via the ad hoc connection,
each of the plurality of sensors to send the data to the mobile device;
upload the collected data to a central repository from the mobile device;
receive information from the central repository related to a problem or event associated with the collected data,
the information being related to the at least one of the plurality of sensors not sending the data or sending incomplete data to the mobile device; and
receive a message from the central repository indicating that the user is to travel to a particular location associated with the problem or event.

8. The system of claim 7, wherein the pairing mechanism is at least one of:
a Bluetooth Low Energy (BLE) pairing, or
a Wi-Fi connection.

9. The system of claim 7, wherein the user is a member of a cleaning staff, a security staff, or a delivery staff, and
the route is associated with a regularly-scheduled route for the cleaning staff, the security staff, or the delivery staff, respectively.

10. The system of claim 7, wherein the data is encrypted on the mobile device after collection from the plurality of sensors and before being uploaded to the central repository.

11. The system of claim 7, wherein the mobile device timestamps and location-stamps the collected data upon collection from the plurality of sensors.

12. The system of claim 7, wherein the information identifying the route outputted on the mobile device includes graphical objects representing locations along the route to be traveled.

13. The system of claim 7, wherein the one or more processors, when forming the ad hoc connection through the pairing mechanism between the mobile device and each of the plurality of sensors, are to:
scan the route for nearby sensors.

14. A non-transitory computer-readable medium storing instructions, the instructions comprising:
one or more instructions that, when executed by one or more processors, cause the one or more processors to:
register a plurality of sensors with a mobile device,
the plurality of sensors including at least one of:
a temperature sensor,
a pressure sensor,
a humidity sensor,
a depth sensor,
a conductivity sensor,
a salinity sensor,
a tilt sensor,
a sound sensor,
a volume sensor,
a rotation sensor,
a light sensor, or
an electrical current sensor,
each of the plurality of sensors being positioned at a particular location along a route,
the route being in proximity to each of the plurality of sensors;
store a list of identifiers for the plurality of sensors on the mobile device;
output information identifying the route on the mobile device to inform a user of the mobile device where to travel so as to be in proximity to at least one of the plurality of sensors;

form an ad hoc connection through a pairing mechanism between the mobile device and each of the plurality of sensors as the user travels the route,
an identifier for each of the plurality of sensors being compared to the list of identifiers stored on the mobile device;
collect data from the plurality of sensors via the ad hoc connection,
each of the plurality of sensors to send the data to the mobile device;
upload the collected data to a central repository from the mobile device;
receive information from the central repository related to a problem or event associated with the collected data,
the information being related to the at least one of the plurality of sensors not sending the data or sending incomplete data to the mobile device; and
receive a message from the central repository indicating that the user is to travel to a particular location associated with the problem or event.

15. The non-transitory computer-readable medium of claim 14, wherein the pairing mechanism is at least one of:
a Bluetooth Low Energy (BLE) pairing, or
a Wi-Fi connection.

16. The non-transitory computer-readable medium of claim 14, wherein the user is a member of a cleaning staff, a security staff, or a delivery staff, and
the route is associated with a regularly-scheduled route for the cleaning staff, the security staff, or the delivery staff, respectively.

17. The non-transitory computer-readable medium of claim 14, wherein the data is encrypted on the mobile device after collection from the plurality of sensors and before being uploaded to the central repository.

18. The non-transitory computer-readable medium of claim 14, wherein the mobile device timestamps and location-stamps the collected data upon collection from the plurality of sensors.

19. The non-transitory computer-readable medium of claim 14, wherein the information identifying the route outputted on the mobile device includes graphical objects representing locations along the route to be traveled.

20. The non-transitory computer-readable medium of claim 14, wherein the one or more instructions, that form the ad hoc connection through the pairing mechanism between the mobile device and each of the plurality of sensors cause the one or more processors to:
scan the route for nearby sensors.

* * * * *